Jan. 12, 1965 G. W. NORRIS 3,165,662
ARC WELDING APPARATUS
Filed May 18, 1962

WITNESSES:
Leon M. Garman
James F. Young

INVENTOR
George W. Norris
BY
Hyman Diamond
ATTORNEY 3,165,662
ARC WELDING APPARATUS
George W. Norris, Wilkins Township, Allegheny County, Pa., assignor to Westinghouse Electric Corporation, East Pittsburgh, Pa., a corporation of Pennsylvania
Filed May 18, 1962, Ser. No. 195,839
2 Claims. (Cl. 314—129)

This invention relates to arc welding and has particular relationship to apparatus for advancing a consumable electrode in arc-welding relationship to the work. While this invention is intimately related to arc-welding in its specific aspects, in its broader aspects it may apply to arc melting and to other like arts. To the extent that this invention is applicable to arc melting as distinct from arc welding or to other arts, the reference in the claims to arc welding is intended to include within its scope arc melting and such other like arts.

This invention concerns itself with the facilities for conducting current to the welding electrode. In electrode advancing apparatus in accordance with the teachings of the prior art, current is conducted either through an electrodt guide tube, through which the electrode passes or through rollers connected to the electrode and specifically to the electrode drive rollers. In both cases sliding contact is involved at some point between the power supply and the electrode. In the case of an electrode guide tube, the sliding contact is between the electrode and the inner surface of the tube. In the case of drive rollers, the sliding contact is between the brushes and the shaft through which power is supplied to the rollers.

Difficulty has been experienced in producing the high quality, high purity welds demanded in certain industries and such difficulty has been ascribed to a large extent to the transmission of welding current through sliding contact. It has been found that the sliding contact does not present a constant impedance to the current and that at times the junction at the sliding contact may become open circuited and produce arcing between the electrode and the contact element in engagement therewith. Such arcing tends to contaminate the electrode and the resulting weld produced.

It is accordingly an object of this invention to eliminate the above-described deficiencies.

It is another object of this invention to provide electrode-advancing means for arc-welding apparatus in which the contact between the arc-welding power supply and the electrode is of the rolling type, presents a constant low impedance to the welding current, and is maintained throughout the welding operation.

A more general object of this invention is to provide apparatus for establishing electrical contact between an elongated conductor and a mechanism which rolls on the conductor without any sliding component between the conductor and the power supply.

In accordance with this invention in its specific aspects, the electrode is driven or advanced by the usual power-driven drive rollers and while so driven is maintained in rolling relationship with rolling-bearing means. As the electrode is moved it causes the rolling bearing means to roll over its surface. Power is supplied to the electrode through this bearing means.

The novel features considered characteristic of this invention are described generally above. For a better understanding of this invention both as to its organization and as to its method of operation together with additional objects and advantages thereof, reference is made to the following description of specific embodiments taken in connection with the accompanying drawing, in which.

Figure 2:
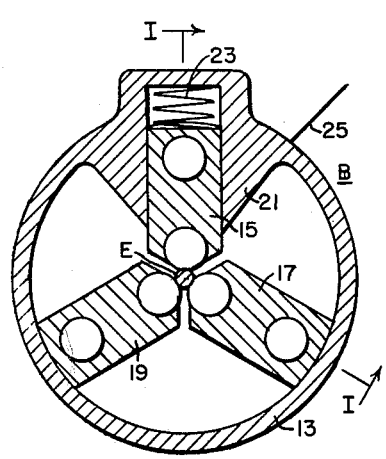
FIG. 2 is a view in section taken along line II—II of FIG. 1.
Figure 1:
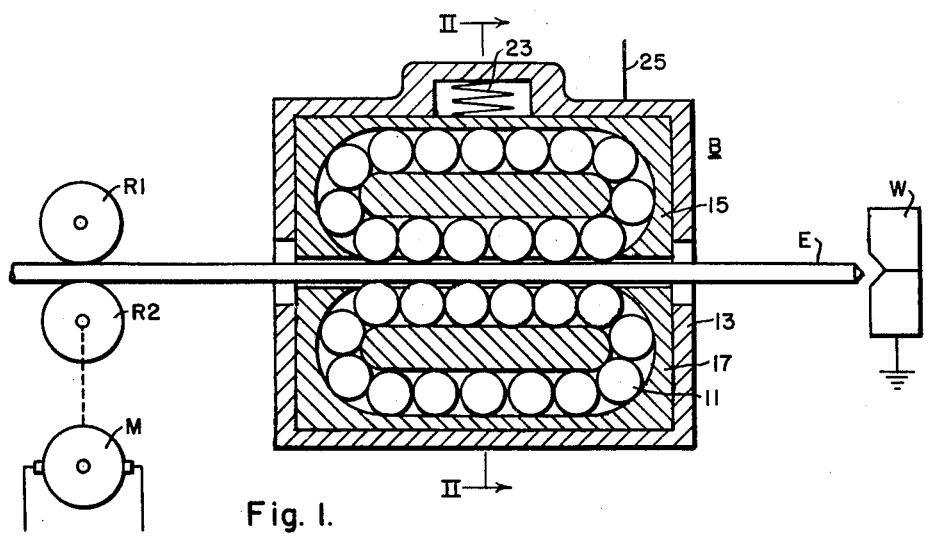
FIGURE 1 is a view in section taken along line I—I of FIG. 2 of a preferred embodiment of this invention.

In FIGS. 1 and 2 this invention is shown as applied to a welding apparatus in which an electrode E is advanced in welding relationship with work W. An arc is produced between the electrode E and the work W and the electrode is melted and deposited on the work.

The electrode E is advanced by rollers R1 and R2 which may be properly serrated to engage the electrode effectively. The rollers R1 and R2 are driven by a motor M and they may be mechanically interconnected so that both rollers R1 and R2 are positively driven.

The electrode E is advanced by the rollers R1 and R2 through a ball bearing assembly B, the balls 11 of which are in rolling engagement with the electrode. This ball bearing assembly B includes a container B having mounted therein three races 15, 17 and 19 of ball bearings 11, the center-lines of the races being displaced 120 degrees with reference to each other. Two of the races 17 and 19 are rigidly fixed within the container 13, the third race 15 is mounted slidable in a track 21 and is urged resiliently towards the other races by a suitable spring 23. The balls 11 of the races engage the electrode E under the action of the spring 23 and as the electrode is advanced the balls successively roll along the electrode. The container 13 is of conducting material and is connected through a conductor 25 to one terminal of a suitable power supply (not shown). The other terminal of the supply and the work W are grounded. The ball bearing assembly B effects conduction of electrical current through the electrode E without any sliding contacts.

Figure 3:
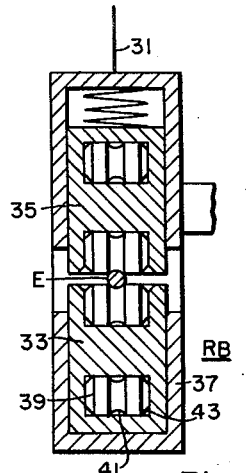
FIG. 3 is a view in transverse section showing a modification of this invention.

FIG. 3 illustrates the use of a roller bearing assembly R3 for establishing electrical contact from a supply conductor 31 to the electrode E. The roller bearing races 33 and 35 are mounted in a container 37 in the same manner as the bearings shown in FIG. 2 and one of the races 35 is urged resiliently towards the other 33. The rolls 39 of the roller bearing are provided with grooves 41 for engaging the electrode and are tapered at the ends 43 and held in correspondingly tapered projections from the respective race enclosures.

The concept here disclosed of driving the electrode E independently of the contacting mechanism is an important feature of this invention. But within its broader aspects this invention comprehends within its scope a system in which the rolling bearings may be driven and may drive the electrode.

While preferred embodiments of this invention have been disclosed herein, many modifications thereof are feasible. This invention then is not to be restricted except insofar as is necessitated by the spirit of the prior art.

I claim as my invention:

1. Arc welding apparatus for welding work with a consumable electrode having a substantially continuously electrically conductive surface comprising means connected to said electrode for advancing said electrode into welding relationship with said work, rolling-bearing means connected to said electrode, at any instant at discrete points along said surface, to be advanced in rolling relationship with said electrode by the advancing of said electrode, and means connected to said rolling-bearing means for supplying current to said electrode.

2. Arc welding apparatus for welding work with a consumable electrode having a substantially continuously electrically conductive surface comprising means connected to said electrode for advancing said electrode into welding relationship with said work, rolling-bearing means connected to said electrode, at any instant at discrete points along said surface, to be advanced in rolling relationship with said electrode by the advancing of said electrode, means connected to said bearing means for maintaining said bearing means in electrical contact with said electrode, and means connected to said rolling-bearing means for supplying current to said electrode.

References Cited in the file of this patent
UNITED STATES PATENTS

| | | |
|---|---|---|
| 1,772,444 | Giacchino | Aug. 5, 1930 |
| 2,019,971 | Hopkins | Nov. 5, 1935 |
| 2,347,646 | Smith | May 2, 1944 |
| 2,689,295 | Goldner | Sept. 14, 1954 |